United States Patent [19]
Willis

[11] 3,954,200
[45] May 4, 1976

[54] MOLDED CONTAINER
[75] Inventor: Wilburn C. Willis, Hagerstown, Ind.
[73] Assignee: Aluminum Company of America, Pittsburgh, Pa.
[22] Filed: Apr. 14, 1975
[21] Appl. No.: 567,620

[52] U.S. Cl. .................................. 215/31; 215/216; 215/221; 215/1 C
[51] Int. Cl.² ...................... B65D 1/02; B65D 11/04
[58] Field of Search ................. 215/9, 31, 216, 221, 215/1 C, 330

[56] References Cited
UNITED STATES PATENTS
| | | | |
|---|---|---|---|
| 3,857,508 | 12/1974 | La Barge et al. | 215/221 |
| 3,891,110 | 6/1975 | Gach | 215/216 |

Primary Examiner—George T. Hall
Attorney, Agent, or Firm—David W. Brownlee

[57] ABSTRACT

A molded container is disclosed which has a cylindrical neck portion with threads on it for securing a closure on the container and a plurality of teeth projecting upwardly from the exterior surface of the container near the threads for engaging mating teeth on the closure. Each of the container teeth has a locking surface which lies in a plane disposed generally radially of the vertical axis of the container and an outwardly-upwardly facing cam surface which lies in a plane angled inwardly toward the vertical axis of the container from the bottom to the top of the tooth and angled with respect to the plane of the locking surface. A method and apparatus for forming such a container is also disclosed.

4 Claims, 4 Drawing Figures

MOLDED CONTAINER

BACKGROUND OF THE INVENTION

1. Field of Invention

This invention relates to molded containers and closures, and in particular to a container having a plurality of teeth on its exterior surface for engaging mating teeth on a closure, and a method and apparatus for forming such a container.

2. Description of the Prior Art

Containers made of plastic, glass and other like materials are usually molded in dies comprising at least two sections which are adapted to be separated at a parting line to permit removal of the molded article from the die cavity. The articles which are molded in such dies, must be so designed as to permit the die section to be parted free of the articles without any interference with the surfaces of the articles. Preferably, the surfaces of such articles have a so-called positive "draft" with respect to the direction in which the die sections are moved during parting to insure that there is no interference between the molded article and the interior surfaces of the die sections during parting.

Some molded containers are used for substances such as drugs, chemicals and the like which are potentially poisonous, and the containers therefor are preferably provided with closures which resist opening by small children. A number of such containers and closures have been developed which employ one or more teeth on the container which are adapted to be engaged by mating teeth on a closure to prevent removal of the closure except by flexing or deformation of the closure or container. Packages of this type are disclosed in a number of patents including the following U.S. Pat. Nos. 2,827,193 to Martin, 3,101,856 to Whiteman, Jr., 3,233,769 to Jessop, 3,360,147 to Schaefer, 3,422,978 to Quackenbush, 3,445,022 to Cilluffo, 3,698,584 to Miller, 3,830,381 to Uhlig and 3,857,508 to LaBarge et al. Another disclosure of interest with respect to teeth on a molded container is contained in British Patent Specification No. 847,332.

The prior art does not disclose a container having a plurality of integral locking teeth thereon which can be easily molded without interference between the teeth and the mold when the mold sections are parted.

SUMMARY OF THE INVENTION

This invention provides a container and a method and apparatus for forming the same with a plurality of teeth on the external surface of the container adjacent closure retaining means thereon wherein the container is adapted to be molded without interference between the teeth on the container and the interior surfaces on the mold sections when the mold is opened to remove the formed container. Each tooth on the container projects upwardly from the exterior surface of the container to engage downwardly projecting teeth on a closure adapted to seal the container and each tooth has a locking surface lying in a plane disposed radially of the vertical axis of the container and an outwardly-upwardly facing cam surface lying in a plane angled inwardly toward the vertical axis of the container from the bottom of the top of such tooth and also angled with respect to the plane of said locking surface.

In a preferred embodiment of this invention, the container has two series of ratchet teeth disposed on opposite quadrants of the container body around the vertical axis of the container. The die sections for forming such a container and the teeth thereon are designed so that the surfaces on the die sections which form the outwardly-upwardly facing cam surfaces on each tooth will not be locked against the teeth, but instead, such surfaces have a positive draft with respect to the direction in which the die sections are moved during parting so as to permit freeing of the molded container from such die sections.

Accordingly, an object of this invention is to provide a container having a plurality of upwardly projecting teeth thereon which can be formed by molding.

Another object of this invention is to provide a molded container having at least two upwardly projecting teeth adjacent a closure retaining means on a container mouth with each of the teeth having a locking surface which is disposed substantially radially of the vertical axis of the container and an outwardly-upwardly facing cam surface lying in a plane which is angled inwardly toward the vertical axis of the container from the bottom to the top of such tooth and angled with respect to the plane of said locking surface.

A further object of this invention is to provide a method for forming a molded container having a plurality of locking teeth thereon for engagement with mating teeth on a closure which is adapted to seal the container.

Another object of this invention is to provide a molding technique for forming a container having two series of teeth in opposite quadrants of the container around the container neck to facilitate parting of the mold after the container has been formed.

The above and other objects and advantages of this invention will be more fully understood and appreciated with reference to the following description and the drawings attached hereto.

DESCRIPTION OF PREFERRED EMBODIMENT

Figure 1:
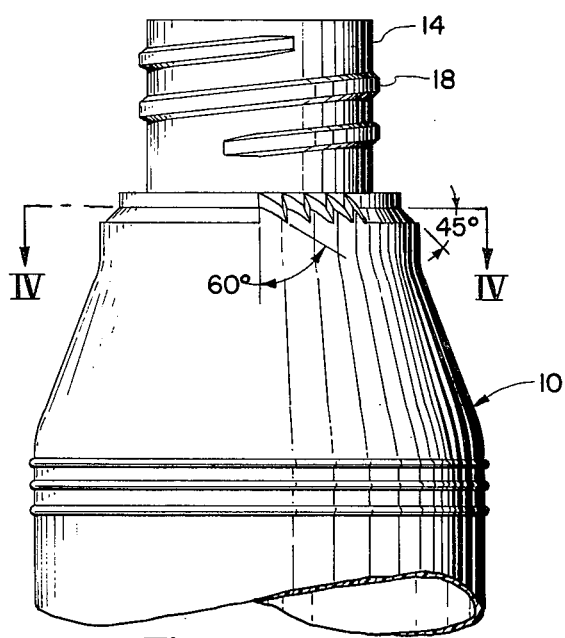
FIG. 1 is a side elevation view of the top portion of a container of this invention.

The attached figures illustrate a container of this invention, generally designated by the numeral 10, which is adapted for packaging a variety of contents, but which is particularly well suited for containing liquid contents which are potentially dangerous if they come in contact with the skin or are taken internally. The container 10 is adapted to receive a closure 12 thereon which cannot be removed from the container without two substantially simultaneous dissimilar motions which can't be easily effected by small children who are most vulnerable to injury by the contents of such containers. A safety closure and container-closure combination of this type is illustrated and described in U.S. Pat. No. 3,857,508, issued in the names of R. L. LaBarge and C. J. Leftault on Dec. 31, 1974.

The container 10 includes a cylindrical neck portion 14 having a mouth opening 16 therein and closure retaining means such as a continuous thread portion 18 on the exterior surface of the neck portion for engaging mating internal threads in a closure adapted to be sealed on the container.

Figure 2:
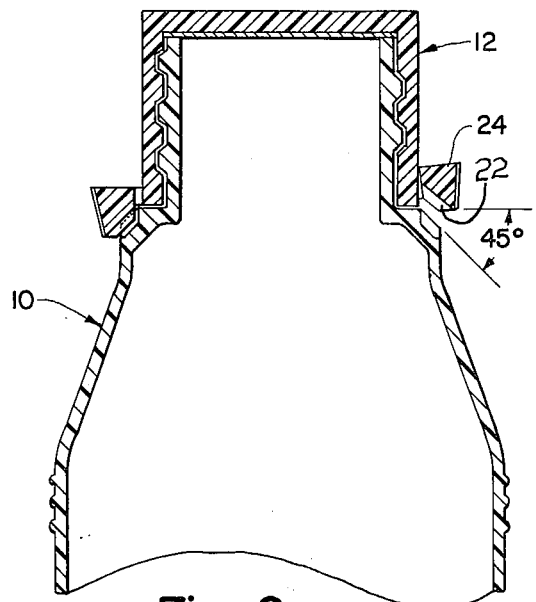
FIG. 2 is a cross sectional view through the container of FIG. 1 and through a closure sealed on such container.
Figure 3:
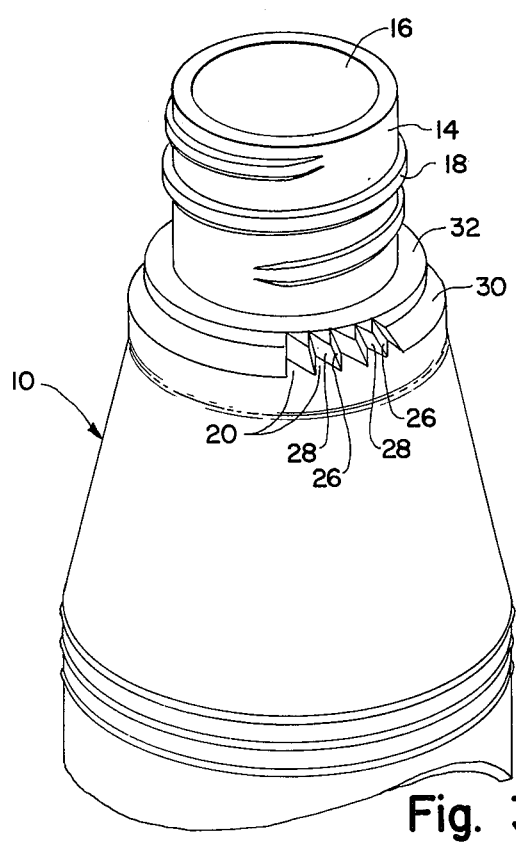
FIG. 3 is a perspective view of the container of FIG. 1.

In accordance with this invention, the container 10 further has a plurality of upwardly projecting ratchet teeth 20 on the exterior surface thereof adjacent the thread 18. The teeth 20 are adapted to be engaged by mating teeth 22 on an integral ring portion 24 around the closure 12 to prevent the closure from being removed from the container without upwardly flexing the ring on the closure to disengage the teeth as is illustrated and described in the LaBarge et al. patent. As is described in that patent, the ring 24 on the closure is resiliently deflectable to permit lifting of the ring at the location of the teeth thereon, as is shown in the right-hand side of FIG. 2. Lifting the ring disengages the locking teeth and permits unscrewing of the closure from the container.

In a preferred embodiment of a container of this invention, which has been selected for illustration, two series of teeth are provided on the container in opposite quadrants of the container around the vertical axis of the container. Each series of teeth includes at least two, and preferably five or more, ratchet type teeth. Each tooth has a locking surface 26 thereon which is disposed in a vertical plane through the axis of the container 10 and a camming surface 28 which faces outwardly and upwardly from the container. The plane of each camming surface 28 is angled inwardly with respect to the axis of the container from the outer edge to the inner edge of each such surface. The plane of the camming surface 28 is also angled with respect to the plane of the locking surface on the tooth, such as to have an included angle of approximately 30°–60° therebetween. The teeth 20 are preferably disposed radially outwardly of the threads on the container neck to facilitate engagement against mating teeth on the ring around the skirt of the closure to be sealed on the container. Thus, the container teeth 20 are disposed on a shoulder 30 on the container outwardly of an integral collar 32 around the bottom of the neck of the container below the thread 18.

The thread 18 on the container neck 14 is preferably oriented with respect to the teeth on the container so as to commence and end, exclusive of the start and stop leads, approximately on a vertical line through the locking surface on the last tooth in one of the series of teeth on the container. The last tooth in a series is that tooth in the series which will be the last to engage a mating tooth on a closure when the closure is threaded or rotated in a clockwise direction during sealing of the closure on the container. The container thread 18 preferably continues for two full turns around the container neck exclusive of the start and stop leads on the thread. In an alternative embodiment, the thread on the container mouth begins and ends approximately on the parting line on the container between the two mold sections used to form the container.

Figure 4:
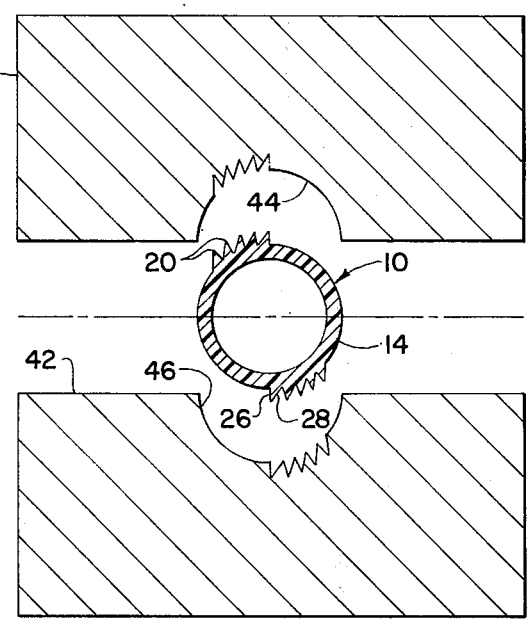
FIG. 4 is a cross-sectional view along line 4—4 through the container of FIG. 1 and through two mold sections which are adapted to form such container.

FIG. 4 illustrates two mold sections or halves 40 and 42 of a mold which may be used for forming a container of this invention, and illustrates a container neck 14 between the two mold sections. The interior molding surface 44, 46 of each mold half is a mirror image of the exterior surfaces on that half of the container which is formed by such mold section. In the preferred embodiment, as viewed in FIG. 4, the mold sections are designed to mold the teeth 20 on the container in the second and fourth quadrants of the container as viewed from the top of the container with the parting line between the mold sections extending from 9 o'clock to 3 O'clock across the top of the container. As used herein, the designation of the first, second, third and fourth quadrants is used to mean the quadrants proceeding clockwise around the container starting at 12 o'clock on the container as viewed in FIG. 4. In that figure, the opposite sides or ends of the two mold sections are adapted to form the teeth on opposite quadrants on opposite sides of the container. Such location of the teeth with respect to the parting line between the mold sections and the angle of the cam surfaces on the teeth permits the two mold sections to be parted in opposite directions to free the molded container from therebetween without interference between the interior surfaces of the two mold halves and the surfaces on the teeth on the exterior of the container. If teeth were provided on the container in the second and/or third quadrants of the container, there would be interference, commonly known as "negative draft", between such teeth and the mold sections because the locking surfaces on such teeth would not have the required positive draft with respect to the direction of movement of the mold sections as they are parted. This positive draft can best be seen in FIG. 1 in which the camming surface on the first tooth in the series of teeth illustrated on the container can be seen in the side view. The first tooth in the series is the tooth which will be engaged first by a tooth on a closure as it is threaded on the container. If the camming surface on such first tooth did not have a positive draft with respect to molding surfaces, or parting direction of the mold the camming surface would not be seen in the side view.

In the preferred embodiment, the locking surface on the last tooth in each series is preferably locate approximately on a diametrical line across the container perpendicular to the parting line between the mold halves. However, such location of the last tooth is not critical to the invention as long as the teeth are disposed in the second and fourth quadrants of the container as viewed in FIG. 4. The teeth in the two series on opposite sides of the container may be offset slightly from being directly opposite, such as by approximately one-quarter to one-half of the pitch distance between two adjacent teeth. Such offset helps to ensure childproof locking of the teeth on the container and closure by insuring that a container will not be sealed with tooth-on-tooth engagement between all of the teeth on the closure and all of the teeth on the container.

The location of the first tooth in the series with respect to the parting line between the two mold sections determines the required angle of the camming surface with respect to the locking surface of all of the teeth. All of the teeth preferably have the same angle between the camming surface and the locking surface so they will all be uniform in configuration. However, since the container is generally cylindrical, each tooth will have a different angular relationship with respect to the direction in which the mold sections are moved during parting. Thus, the camming surface 28 on the tooth which is closest to the parting line faces more toward the parting line than do the cam surfaces on any of the other teeth. If such camming surfaces 28 on the teeth were not disposed in a plane angled inwardly toward the vertical axis of the container from the outer edge to the inner edge of such surface, the camming surfaces would not have the necessary positive draft with respect to the direction of parting. Since the camming surface on the tooth closest to the parting line in each series is turned or faces more toward the parting line, that surface is the controlling surface with respect to the angle which is required for enabling parting of the dies without interference between the teeth on the container and the interior mold surfaces. In a container having five or so teeth on the exterior neck thereof, the camming surface of each tooth is preferably disposed at approximately a 45° angle with the vertical axis of the container from the outer edge to the inner edge of such camming surface. Such angle will vary with the number of teeth on the bottle, the location of the teeth and the pitch distance therebetween, among other factors.

It is therefore seen that this invention provides a moldable container having a series of integral teeth thereon for engagement by mating teeth on a closure for sealing a container, wherein the teeth may be molded in a two-part die without interference between the container teeth and the mold surfaces. A method and molding die for forming such a container are also provided. Although a preferred embodiment has been illustrated and described, it will be apparent to those skilled in the art that numerous variations can be made in such preferred embodiment without departing from the invention or the scope of the claims appended hereto.

What is claimed is:

1. A molded container having a cylindrical neck portion with a mouth opening therein and at least two adjacent teeth projecting upwardly from the exterior surface of the container near said neck portion for engagement by at least one mating tooth on a closure adapted for closing the container mouth opening, each such container tooth having a locking surface thereon in a plane disposed generally radially through the vertical axis of the container and an outwardly-upwardly facing cam surface thereon in a plane angled, from the outer edge to the inner edge of such camming surface, inwardly toward the vertical axis of the container and angled with respect to the plane of said locking surface.

2. A container as set forth in claim 1 in which said cam surface is disposed at approximately a 45° angle with respect to the vertical axis of the container.

3. A molded container as set forth in claim 1 having two sets of multiple teeth thereon in opposite quadrants of the container around the vertical axis of the container.

4. A molded container as set forth in claim 3 having a closure securing thread portion thereon which commences and ends approximately on a vertical line through the locking surface on the last tooth in one of the two series of teeth on the container.

* * * * *